United States Patent
Smith

[15] 3,704,450
[45] Nov. 28, 1972

[54] SEISMIC TRACE CENTER-LINE GENERATOR

[72] Inventor: Clarence G. Smith, Irving, Tex.

[73] Assignee: Mobil Oil Corporation

[22] Filed: July 26, 1971

[21] Appl. No.: 166,167

[52] U.S. Cl.............................................340/172.5
[51] Int. Cl.................................................G06f 3/14
[58] Field of Search............................340/172.5, 324

[56] References Cited

UNITED STATES PATENTS

| | | |
|---|---|---|
| 3,333,247 | 7/1967 | Hadley et al.............340/172.5 |
| 3,348,229 | 10/1967 | Freas..................340/172.5 X |
| 3,422,419 | 1/1969 | Matthews et al. .........340/324 |
| 3,512,131 | 5/1970 | Nelson et al............340/172.5 |

Primary Examiner—Harvey E. Springborn
Attorney—William J. Scherback et al.

[57] ABSTRACT

Multiplexed seismic data representing a plurality of seismic channels intensity modulates each sweep of the electron beam on a cathode-ray tube. Each successive sweep of the electron beam is photographically reproduced on a rotating drum plotter to provide a plurality of seismic traces. A multiposition selector switch is provided to select traces to be marked with a center line through the entire length of the trace as it is recorded on the drum plotter. A generator provides center-line pulses for the selected traces to intensity modulate the electron beam of the cathode-ray tube in time coincidence with the intensity modulation of the electron beam by the multiplexed seismic data for the selected traces. A two-position switch is provided to permit the generator to reverse the order in which the traces are marked with a center line.

5 Claims, 12 Drawing Figures

FIG. I

CLARENCE G. SMITH
INVENTOR

FIG. 2

CLARENCE G. SMITH
INVENTOR

BY George W Hogan Jr
ATTORNEY

CLARENCE G. SMITH
INVENTOR

BY George N. Haga Jr.

ATTORNEY

SEISMIC TRACE CENTER-LINE GENERATOR

BACKGROUND OF THE INVENTION

Seismic data representing a plurality of seismic channels is conventionally stored on magnetic tape for further data processing. In one such data processing operation, the information stored on the magnetic tape is used to modulate a cathode-ray tube so as to display the information on the face of the cathode-ray tube. Such display can than be photographically reproduced by means of a conventional drum plotter. The photographic reproduction obtained is a series of traces, one such trace for each seismic channel, recorded in a parallel relationship. In such data processing operations, the seismic data stored on magnetic tape is converted to seismic analog signals. These analog signals are then multiplexed so as to provide intensity-modulation pulses for application to the electron beam of a cathode-ray tube as it sweeps across the face of the display. One intensity-modulation pulse is provided during each sweep of the electron beam for each of the seismic channels. Rotation of the drum plotter past the face of the cathode-ray tube results in each sweep of the electron beam being recorded on the drum plotter in a position displaced from the previous sweep, resulting therefore in a series of seismic trace recordings on the photographic material surrounding the drum plotter.

SUMMARY OF THE INVENTION

The present invention is directed to apparatus by which specific seismic traces recorded on photographic material can be readily distinguished from the other seismic traces. In this aspect, there is provided a generator, including a selector switch for each seismic channel, for producing center-line pulses for the traces of those channels selected by the setting of the selector switches. The center-line pulses from the generator are applied to the cathode-ray tube to intensity modulate the electron beam as it sweeps across the face of the cathode-ray tube at a location representative of the center line of the selected seismic trace. The display produced on the face of the cathode-ray tube is focused onto a rotating drum plotter which reproduces each successive sweep of the electron beam across the face of the cathode-ray tube to produce a continuous seismic trace for each of the plurality of seismic channels. Those traces selected will have a line marked through the center for their entire length.

More particularly, there is provided a shift register having a plurality of stages, one for each seismic channel. A clock is coupled to the shift register for shifting the register sequentially the entire length of the register for each sweep of the electron beam for producing a plurality of count outputs, one for each of said seismic channels. A plurality of gates, one for each seismic trace, have a first input coupled to the shift register stage with a count representative of the respective seismic trace and a second input coupled to the selector switch representative of the respective seismic trace. These gates provide enabling signals when the shift register is shifted to those stages representative of the selected seismic traces. A monostable multivibrator, having its input coupled to the output of each of said gates, provides a center-line pulse upon the presence of the enabling signals from any one of the gates.

In accordance with a further aspect of the invention, there is provided a gate coupling the multiplexed modulation pulses and the center-line pulses to the cathode-ray tube to intensity modulate the electron beam as it sweeps across the face of the cathode-ray tube.

In accordance with a more specific embodiment of the invention, there is provided a switch coupled to each of the plurality of enabling gates. The switch, in a first or normal position, couples the enabling gates to the shift register stages so as to permit center-line marking of the seismic traces in one sequence on the drum plotter and, in a second or reverse position, couples the enabling gates to the shift register stages so as to permit center-line marking in the reverse sequence.

DESCRIPTION OF THE PREFERRED EMBODIMENT

Figure 1:
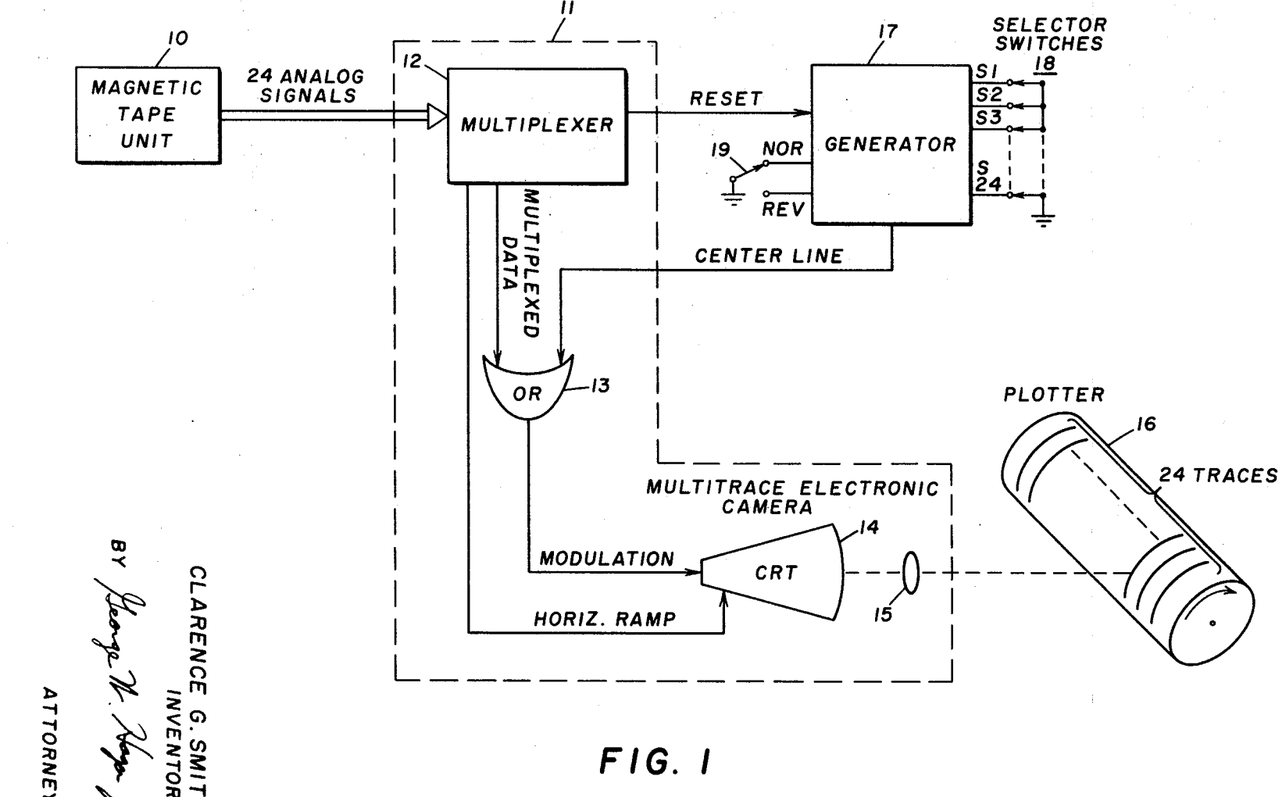
FIG. 1 is a block diagram schematic of one embodiment of the present invention.

Referring to FIG. 1, there is shown in block diagram one system embodying the present invention. A magnetic tape unit 10 converts seismic data representing, for example, 24 seismic channels to 24 seismic analog signals. These seismic analog signals are applied to a multitrace electronic camera 11. Multitrace electronic camera 11 comprises a multiplexer 12, an OR gate 13, a cathode-ray tube 14, and a lens 15. The multiplexer accepts and converts the twenty-four channels of seismic analog signals to multiplexed seismic data. The multiplexed data is then applied by way of OR gate 13 to cathode-ray tube 14 for intensity modulation of the electron beam. Multiplexer 12 also supplies to the cathode-ray tube a horizontal ramp signal for controlling the sweep of the electron beam across the face of the cathode-ray tube. The multiplexed data successively intensity modulates the electron beam one time during each sweep of the electron beam across the face of the cathode-ray tube for each of the 24 seismic channels. The display on the face of the cathode-ray tube is focused by lens 15 onto a plotter 16. Plotter 16 comprises a rotatable drum around which is placed a photosensitive film or paper on which is recorded the display presented on the face of cathode-ray tube 14. Each successive sweep of the electron beam on the face of the cathode-ray tube is photographically reproduced on plotter 16 in a side-by-side relationship.

A magnetic tape unit suitable for use with the foregoing-described system is the TIDAR, a digital analog recorder manufactured by Texas Instruments Incorporated, Dallas, Texas. The TIDAR system stores magnetic tape input data in a buffer memory. The buffer memory transfers words under clock control to a digit register for conversion to analog signals. The analog signals are applied to a multitrace electronic camera 11. The memory buffer controls the net data rate from the magnetic tape to prevent the overflow or emptying of the memory until the transfer of analog signals to the multitrace electronic camera 11 is complete. This ensures that the cathode-ray tube display will be at a continuous and uniform data rate from beginning to end of the data transfer from the 24 seismic channels.

A multitrace electronic camera suitable for use in the system described herein is the Model MEC–630–A manufactured by Geospace Corporation of Houston, Texas. Such multitrace electronic camera comprises a multiplexer 12 which contains twenty-four seismic signal multiplexers, one for each seismic channel. The multiplexers convert the seismic analog signals to pulse width modulation signals suitable for cathode-ray tube presentation. These modulation signals intensity modulate the electron beam as it sweeps across the face of cathode-ray tube 14. A linear sweep or horizontal ramp signal of 250 microseconds duration is generated and applied to the cathode-ray tube to control the sweep of the electron beam across the face of the display. The horizontal ramp signal also gates the 24 multiplexers ON and OFF once for each sweep of the electron beam or every 250 microseconds. The 24 multiplex outputs are applied by gate 13 to cathode-ray tube 14.

A plotter suitable for use with the system described herein is the PL–600 Series Cross-Section Plotter manufactured by Dresser SIE, Inc., Houston, Texas. The PL–600 Cross-Section Plotter produces a 5.5-second photographic record at the rate of 7.5 inches per second. The multitrace electronic camera 11 exposes only a small portion of the total plotter width in a given 24 seismic trace plot. In order to plot additional 24 seismic trace recordings adjacent to previous recordings, the camera is mounted on a movable assembly which may be automatically stepped laterally to the next 24 seismic trace recording position.

As a specific feature of the present invention, there is provided a generator 17 which allows selected seismic traces reproduced on the plotter 16 to be marked by a single line drawn down the center of the seismic trace for the entire length of the trace. Any number of the seismic traces may be center-line marked and are selected by selector switches 18. There are 24 selector switches, one for each of the 24 seismic traces.

Multiplexer 12 provides a reset pulse at the start of each horizontal ramp signal. The reset pulse is applied to generator 17 to initiate the production of center-line pulses. Generator 17 produces a center-line pulse once during each sweep of the electron beam across the face of the cathode-ray tube for each seismic trace selected by the setting of selector switches 18. These center-line pulses are applied by gate 13 to the cathode-ray tube 14.

Figure 2:
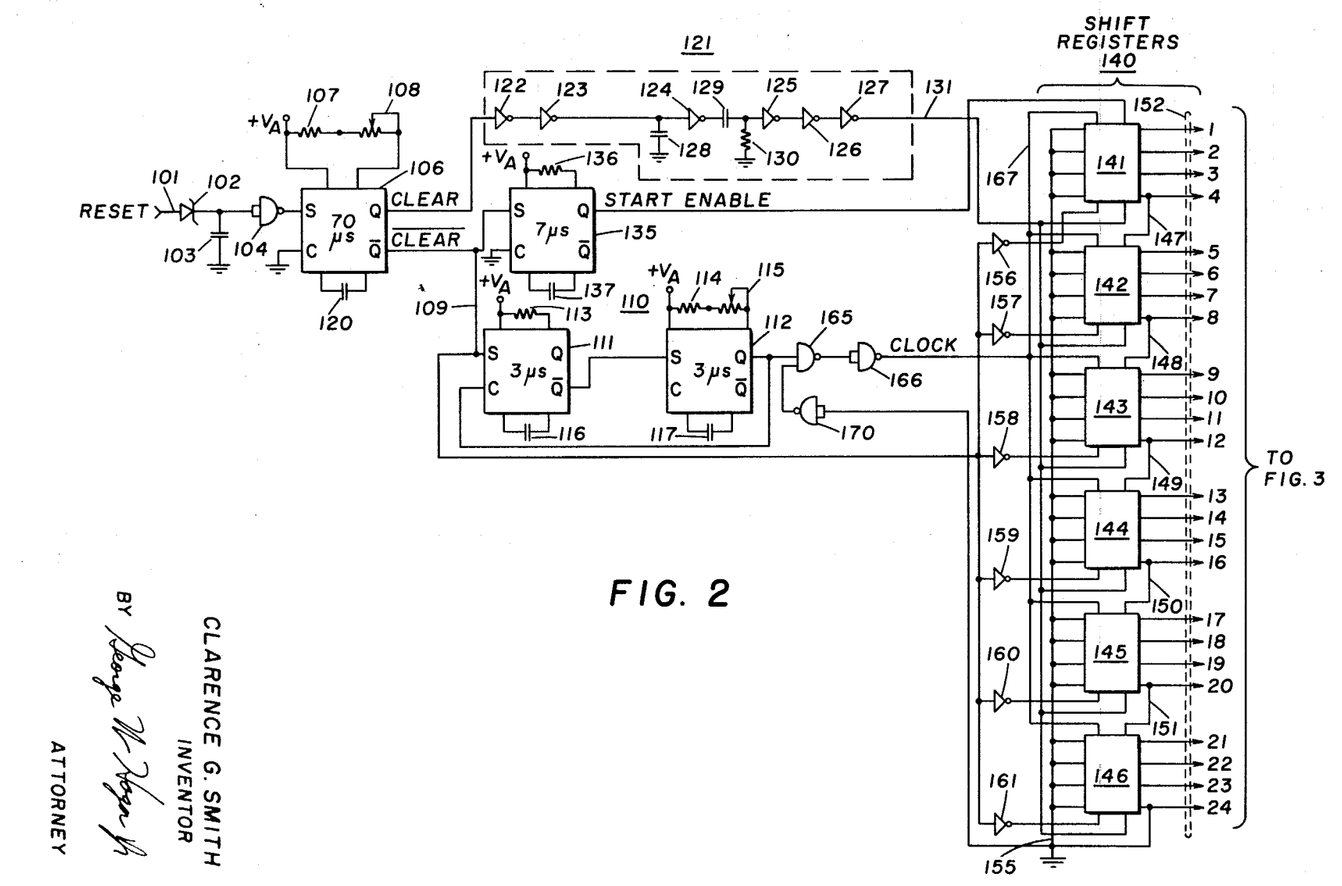
FIGS. 2 and 3 are circuit schematics of a portion of FIG. 1.

Referring now to FIG. 2, there is illustrated a portion of the circuit schematic of generator 17 of the present invention. The reset pulse produced by multiplexer 12 coincident with the beginning of each sweep of the electron beam is coupled by way of conductor 101, diode 102, capacitor 103, and Nand gate 104 to the input of a monostable multivibrator 106. Bias and control for multivibrator 106 are supplied by a positive voltage supply $V_A$, resistors 107 and 108, and capacitor 120. Multivibrator 106 produces approximately a 70-microsecond wide pulse which is adjustable over a narrow range by resistor 108. The outputs of multivibrator 106 are clear and $\overline{clear}$ signals. The $\overline{clear}$ signal is coupled by conductor 109 to a 166.7-kilohertz oscillator 110. Oscillator 110 comprises a pair of 3-microsecond monostable multivibrators 111 and 112. Bias and control for multivibrator 111 are supplied by the voltage supply $V_A$, resistor 113, and capacitor 116. Bias and control for multivibrator 112 are supplied by voltage supply $V_A$, resistors 114 and 115, and capacitor 117. The presence of the $\overline{clear}$ signal on conductor 109 disables the oscillator 110 for the 70-microsecond duration of the $\overline{clear}$ signal. The $\overline{clear}$ signal is also applied as an input to a 7-microsecond monostable multivibrator 135. Multivibrator 135 is biased and controlled by voltage supply $V_A$, resistor 136, and capacitor 137 and is disabled during the 70-microsecond period of the $\overline{clear}$ signal. At the end of the $\overline{clear}$ signal, multivibrator 135 generates a 7-microsecond start enable pulse. The clear signal is applied as input to a delay pulse generator 121 comprising a series of inverters 122–127, a pair of capacitors 128 and 129, and a resistor 130. Delay pulse generator 121 delays the clear signal by a period of approximately 120 nanoseconds. The delayed clear signal, the $\overline{clear}$ signal, the start enable signal, and the 166.7-kilohertz oscillator 110 are used as control signals for a bank of shift registers 140.

Shift registers 140 comprise a series of six registers 141–146. Each register is a four-stage register with the last stage of each register connected in series with the first stage of the succeeding register by way of conductors 147–151. Shift registers 140 thereby provide a series of 24-count outputs to the connector 52.

EAch stage of registers 141–146 is grounded by means of common bus 155. The $\overline{clear}$ signal is coupled by way of inverters 156–161 to registers 141–146, respectively. During the 70-microsecond period of the $\overline{clear}$ signal, the oscillator 110 is disabled and each of the registers 141–146 is placed in the parallel entry mode. The delayed clear signal is applied by conductor 131 as the parallel entry clock to registers 141–146. Since all the stages are grounded by common bus 155, the count outputs on stages 1–24 of the shift registers 140 will all clear to a logic 0. Termination of the 70-microsecond $\overline{clear}$ signal resets the shift registers to the serial entry mode and starts the 166.7-kilohertz oscillator 110. The clock pulse output from oscillator 110 is applied by way of Nand gates 165 and 166 and common bus 167 to the serial input clock lines of each of the shift registers 141–146. Termination of the $\overline{clear}$ signal also causes multivibrator 135 to produce a 7-microsecond start enable pulse which is applied to the serial input of stage 1 of shift register 141. The one bit entered into shift register 141 by the start enable signal is then shifted down the shift register chain 140 at the clock rate, causing a sequential count output of 1–24 with an individual pulse width of 6 microseconds for each count. Each of the 24 counts is at a logic level 1. When the count 24 is reached, Nand gate 170 goes to a logic 0, thereby disabling the Nand gate 165 and terminating the coupling of the clock pulse to the clock input lines of shift registers 141–146.

Figure 3:
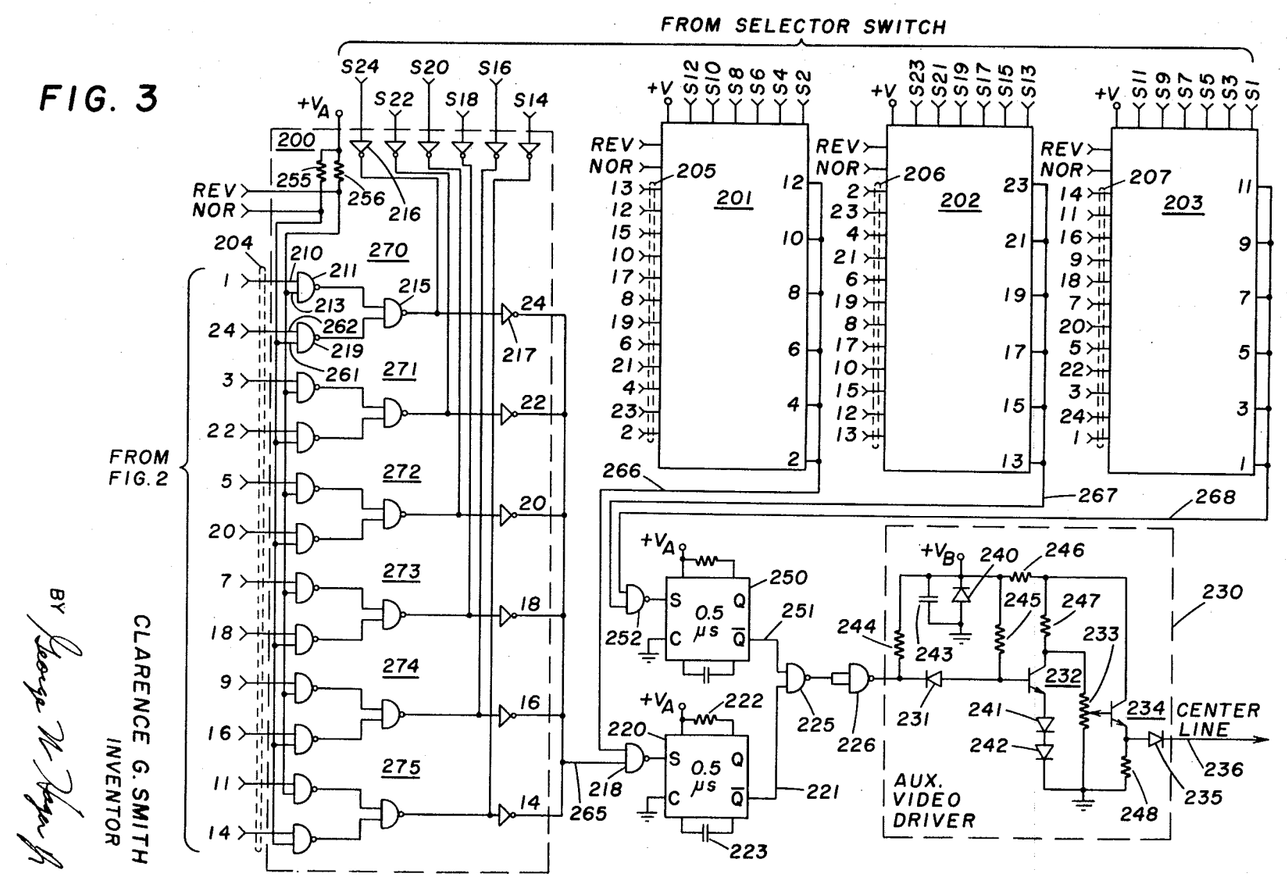

Referring now to FIG. 3, there is illustrated a series of circuits 200–203 to which the twenty-four-count outputs on connector 152 (FIG. 2) are selectively coupled by way of connectors 204–207, respectively. Also selectively connected to circuits 200–203 are the selector switches S1–S24. Circuit 203 provides outputs for use in the center-line marking of the odd-numbered seismic traces 1–11 as selected by the setting of the corresponding selector switches S1–S11. Circuit 202 provides outputs for the odd-numbered seismic traces 13–23 as selected by the setting of the corresponding selector switches S13–S23. Similarly, circuits 201 and 200 provide outputs for the even-numbered seismic traces 2–12 and 14–24, respectively, for selector switch settings S2–S12 and S14–S24, respectively. The six outputs of circuit 200 are each applied by common conductor 265 to Nand gate 218 and monostable multivibrator 220 as are the six outputs of circuit 201 by common conductor 266. Similarly, the six outputs of circuits 202 and 203 are coupled by common conductors 267 and 268 to Nand gate 252 and monostable multivibrator 250. Prior to the marking of a selected seismic trace, all of the 24 outputs from circuits 200–203 are at a logic 1 level, thereby placing a logic 1 on each of common conductors 265–268. A logic 0 level on any one of the twenty-four outputs indicates that a seismic trace is to be marked. A logic 0 level on any one of the even-numbered outputs is applied by either the common conductor 265 or 266 and Nand gate 218 to trigger multivibrator 220 to generate a 0.5-microsecond pulse on conductor 221. A logic 0 level on any one of the odd-numbered outputs is applied by either common conductor 267 or 268 and Nand gate 252 to trigger multivibrator 250 to generate a 0.5-microsecond pulse on conductor 251. The triggering of either multivibrator 220 or 250 causes the auxiliary video driver 230 to provide a 0.5-microsecond, center-line pulse on conductor 236.

A normal mode of recording with the Model MEC–630–CA multitrace electronic camera is to record seismic traces 1-24 sequentially, with trace 24 being recorded at the start of each sweep of the electron beam and trace 1 being recorded at the end of each sweep. A reverse mode of recording is to record seismic traces 1–24 sequentially, with trace 1 being recorded at the start of each sweep and trace 24 being recorded at the end of each sweep. Accordingly, there is provided for generator 17 a two-position switch 19 which in a first or normal position provides for the center-line marking of selected seismic traces recorded in the normal mode and in a second or reverse position provides for the center-line marking of selected seismic traces recorded in the reverse mode. EAch of the circuits 200–203 is connected by way of REV or NOR input terminals to the reverse and normal positions of switch 19. As each of circuits 200–203 is identical in configuration, only the operation of circuit 200 will be described hereinafter in detail.

Circuit 200 includes six gates 270–275 representing even-numbered seismic traces 24–14, respectively. Gate 270, for example, includes Nand gates 211, 215, and 219 and inverters 216 and 217 and represents trace 24. Inputs to gate 270 are the count 1 and count 24 outputs from shift register 140. Count 1 corresponds to the time of recording of trace 24 in the normal mode, and count 24 corresponds to the recording of trace 24 in the reverse mode. In the normal mode, for example, switch 19 is placed in the normal position so as to apply electrical ground by way of the NOR input and conductor 261 to Nand gate 219, thereby disabling Nand gate 219 from responding to count 24. The REV input is open, thereby permitting a logic 1 to be applied to Nand gate 210 by way of voltage source $V_A$, resistor 256, and conductor 213. At count 1, there is applied by way of conductor 210 a logic 1 input to Nand gate 211. With both conductors 210 and 213 at logic 1, the output of Nand gate 211 is at a logic 0. This logic 0 output of Nand gate 211 forces Nand gate 215 to a logic 1 if the selector switch for seismic trace 24 has been closed so as to place ground on the input S24 to inverter 216. The logic 1 output of Nand gate 215 is inverted by inverter 217 to apply a logic 0 to the trace 24 output conductor of circuit 200. Common conductor 265 applies the logic 0 to Nand gate 218 to cause the output of Nand gate 218 to go to a logic 1. This logic 1 output of Nand gate 218 triggers a 0.5-microsecond monostable multivibrator 220 to provide a 0.5-microsecond pulse on conductor 221. The 0.5-microsecond pulse is then applied by means of Nand gates 225 and 226 to auxiliary video driver 230. The 0.5-microsecond pulse is then coupled by diode 231, transistor 232, variable resistor 233, transistor 234, and diode 235 to output conductor 236 as the center-line pulse for the marking of seismic trace 24 at count 1.

To record seismic trace 24 in the reverse mode, the switch 19 is placed in the reverse position so as to apply electrical ground by way of the REV input and conductor 213 to Nand gate 211, thereby disabling Nand gate 211 from responding to a count 1. The selector switch for trace 24 is again closed to ground the input of inverter 216. The NOR input is open, thereby permitting a logic 1 to be applied to Nand gate 219 by way of voltage source $V_A$, resistor 255, and conductor 261. Upon count 24 from shift register 140, a logic 1 level is applied on conductor 262 to Nand gate 219. With both conductors 261 and 262 at logic 1, the output of Nand gate 219 is a logic 0. Nand gate 219 in turn sets Nand gate 215 to a logic 1. The logic 1 output of Nand gate 215 is inverted by inverter 217 to apply a logic 0 to the trace 24 output conductor of circuit 200. In the same manner as described for the normal mode, the trace 24 output is coupled by common conductor 265 to multivibrator 220 and auxiliary video driver 230 for the generation of the 0.5-microsecond center-line pulse on output conductor 236.

Bias and control for multivibrator 220 is supplied from voltage source $V_A$, resistor 222, and capacitor 223. Bias for auxiliary video driver 230 is supplied by means of voltage source $V_B$, diodes 240–242, capacitor 243, and resistors 244–248. Variable resistor 233 serves to adjust the amplitude of the pulse to a level which is approximately 2 volts greater than the voltage level of multiplexed data from multiplexer 12, for example, to a level of approximately 17 volts.

Figure 4A:
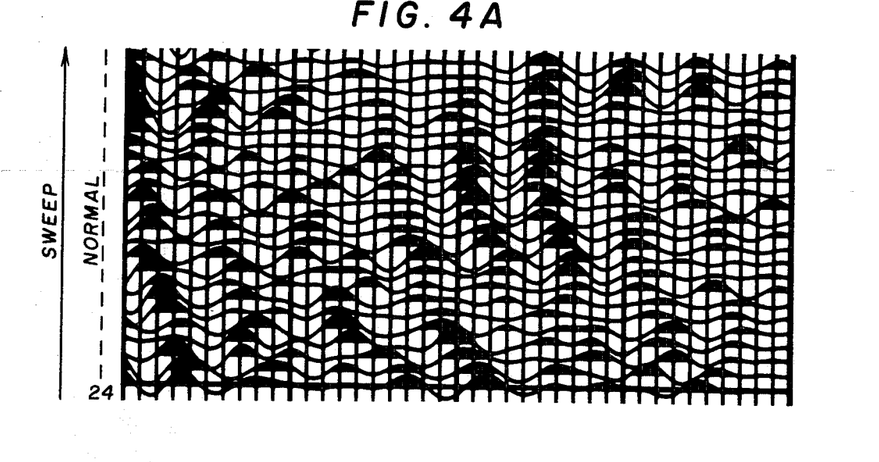
FIGS. 4A and 4B are seismic traces obtained from the embodiment of the present invention.
Figure 4B:
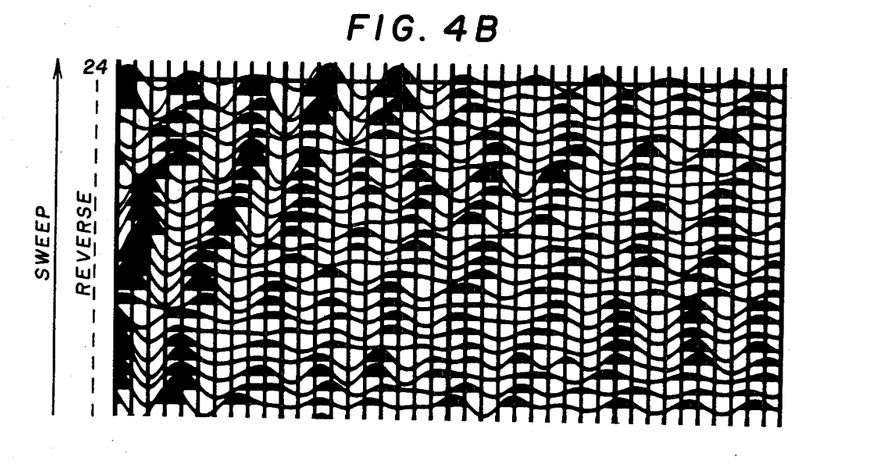

FIGS. 4A and 4B are illustrative of the normal and reverse modes of recording, respectively. In both modes of recording it is noted that the direction of the sweep of the electron beam across the face of the cathode-ray tube is in the direction indicated by the arrow on both FIGS. 4A and 4B relative to the direction of recording of the seismic traces on the drum plotter. With reference to FIG. 4A, it is noted that in the normal mode the electron beam of the cathode-ray tube is intensity modulated one time during each sweep of the electron beam across the face of the cathode-ray tube sequentially for each of the 24 traces beginning with trace 24 and ending with trace 1. With reference to FIG. 4B, it is noted that in the reverse mode the electron beam is intensity modulated one time during each sweep of the electron beam across the face of the cathode-ray tube sequentially for each of traces 1–24, beginning with trace 1 and ending with trace 24.

Figure 5A:
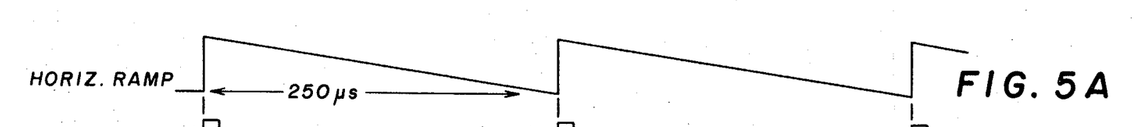
FIGS. 5A–5G are a series of waveforms representative of signals appearing at the indicated points in the schematics of FIGS. 1–3.
Figure 5B:
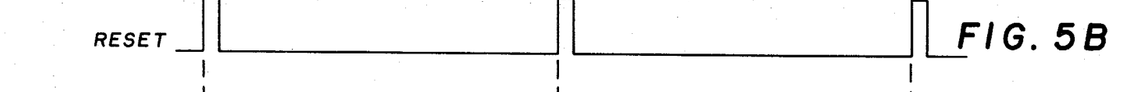
Figure 5C:
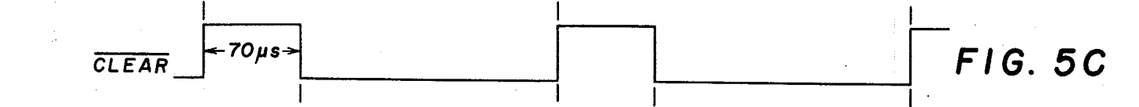
Figure 5D:
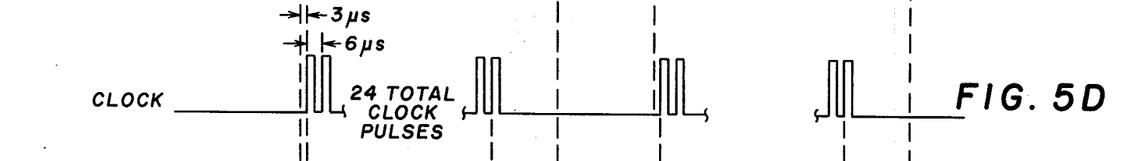
Figure 5E:
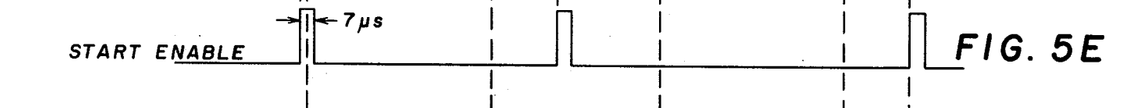
Figure 5F:
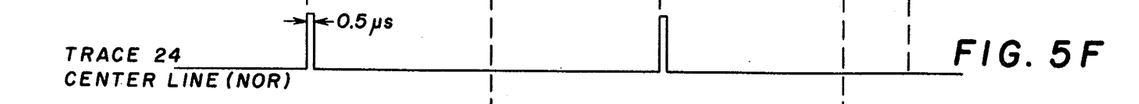
Figure 5G:
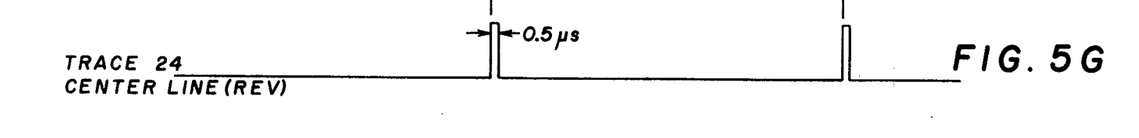

For a more complete understanding of the present invention, FIGS. 5A and 5G are included and represent a series of waveforms of signals appearing at various points throughout the system as indicated in FIGS. 1–3.

FIG. 5A represents the horizontal ramp signal, having a period of 250 microseconds, which is applied by the multiplexer 12 to the sweep drive circuit of the cathode-ray tube 14 and further is utilized by multiplexer 12 to generate the reset pulse as is indicated in FIG. 5B.

FIG. 5C illustrates the 70-microsecond $\overline{\text{clear}}$ pulse which is produced at the beginning of each reset pulse by the multivibrator 106. As has been previously discussed, the 3-microsecond multivibrator 111 is triggered at the trailing edge of the 70-microsecond $\overline{\text{clear}}$ period. Following this 3-microsecond period, multivibrator 112 is triggered which provides a total of 24 clock pulses with a 6-microsecond period as indicated in FIG. 5D.

FIG. 5E illustrates the start enable signal which is generated by the 7-microsecond multivibrator 135 upon its triggering by the trailing edge of the $\overline{\text{clear}}$ pulse.

FIG. 5F illustrates the time relationship of the center-line pulse in the normal mode of recording when trace 24 has been selected to be center-line marked. In the normal mode of recording, the center-line pulse occurs at the 24th clock pulse.

FIG. 5G illustrates the center-line pulse in the reverse mode of recording for the selected trace 24. In reverse mode, the center-line pulse for trace 24 occurs at the first clock pulse.

Various values and types of circuit components may be utilized for the circuits illustrated in FIGS. 2 and 3. In accordance with one specific circuit that has been successfully built and operated, the following TABLE I sets forth specific types and values of circuit components.

TABLE I

| Reference Designation | Description |
| --- | --- |
| $V_A$ | +5 VDC |
| $V_B$ | +28 VDC |
| All monostable multivibrators | SN 74121 Texas Instruments |
| All shift registers | MC 4012 P Motorola |
| All Nand gates | MC 846 P Motorola |
| All inverters | MC 836 P Motorola |
| Capacitors 116 and 120 | 0.01 μf |
| Capacitors 117 and 137 | 0.001 μf |
| Capacitors 103 and 129 | 510 pf |
| Capacitor 128 | 0.0068 μf |
| Capacitor 223 | 270 pf |
| Capacitor 243 | 100 μf |
| Diode 102 | IN706 |
| Diodes 231, 235, 241, and 242 | IN463 |
| Diode 240 | IN750 |
| Transistors 232 and 234 | 2N3904 |
| Resistor 107 | 9.1 kohms |
| Variable resistors 108 and 115 | 1 kohm |
| Resistor 136 | 10 kohms |
| Resistor 113 | 4.3 kohms |
| Resistor 114 | 3.9 kohms |
| Resistors 130, 255, and 256 | 4.7 kohms |
| Resistor 222 | 2.7 kohms |
| Resistor 244 | 620 ohms |
| Resistor 245 | 2.4 kohms |
| Resistor 247 | 1 kohm |
| Resistor 248 | 2 kohms |
| Variable resistor 233 | 10 kohms |

The foregoing circuit types and values have been given as illustrative of one embodiment of the present invention and can be taken as a general guide toward design of one such embodiment though it is understood that in other modifications other circuit values and types could be used.

I claim:

1. A system for photographically reproducing seismic data stored on magnetic tape, comprising:
   a. means for converting seismic data representing a plurality of seismic channels and stored on said magnetic tape to a plurality of seismic analog signals,
   b. means for converting said analog signals to a plurality of pulse width modulation signals for each analog signal,
   c. means for multiplexing said plurality of modulation signals to successively apply one modulation signal for each of said plurality of seismic channels to a cathode-ray tube to successively intensity modulate the electron beam of said cathode-ray tube one time during each sweep of the electron beam across the face of said cathode-ray tube for each of said plurality of channels,
   d. a generator including a plurality of selector switches, one for each of said seismic channels, for producing center-line pulses for the seismic traces on the seismic channels selected by the setting of said selector switches,
   e. means for applying said selected center-line pulses to said cathode-ray tube to intensity modulate the electron beam as it sweeps across the face of said cathode-ray tube at a location representative of the center point of the seismic trace of the selected seismic channel, and
   f. means for photographically reproducing each successive sweep of said electron beam across the face of said cathode-ray tube to produce a continuous seismic trace for each of said plurality of seismic channels, those channels selected by said selector switches having a line marked through the center of the trace for the entire length of the trace.

2. The system of claim 1 wherein said generator includes:
   a. a shift register having a plurality of stages, one for each of said seismic channels,
   b. a clock coupled to said shift register for shifting said register sequentially the entire length of said register for each sweep of said electron beam,
   c. a plurality of first gates, one for each of said seismic channels, having one input coupled to the selector switch representative of the seismic channel and having a second input coupled to the shift register stage representative of the respective seismic channel, whereby said gates provide enabling signals upon said shift register being shifted to those stages representative of the seismic channels selected by said selector switches, and d. a monostable multivibrator having an input coupled to the output of each of said first gates, said multivibrator providing a center-line pulse upon the presence of an enabling signal on any one of said first gates.

3. The system of claim 2 further including:

a second gate having said multiplexed modulation signals applied to a first input and said center-line pulses applied to a second input, the output of said second gate being applied to said cathode-ray tube to intensity modulate said electron beam with both said multiplexed modulation signals and said center-line pulses as it sweeps across the face of said cathode-ray tube.

4. The system of claim 2 including:

a switch coupled to each of said plurality of first gates which, when closed, enables said second inputs of said first gates to be coupled to the shift register stages representative of the reverse order of said seismic channels, whereby said first gates provide enabling signals upon said shift register being shifted to those stages representative of the reverse order of the seismic channels selected by said selector switches.

5. In a seismic data processing system for photographically reproducing seismic data from a plurality of seismic channels including a converter for providing a plurality of pulse width modulation signals representing the data contained on each seismic channel, a multiplexer for successively applying one modulation signal for each of said plurality of seismic channels to a cathode-ray tube to successively intensity modulate the electron beam one time during each sweep of the electron beam across the face of said cathode-ray tube for each of said seismic channels, and a drum plotter for photographically reproducing in a side-by-side relationship each sweep of said electron beam whereby a plurality of seismic traces are recorded simultaneously in parallel, the combination therewith of:

a. a plurality of selector switches, one for each of said seismic channels, b. a shift register having a plurality of stages, one for each of said seismic channels, c. a clock coupled to said shift register for shifting said register sequentially the entire length of said register for each sweep of said electron beam, d. a plurality of first gates, one for each of said seismic channels, having one input coupled to the selector switch representative of the seismic channel and a second input coupled to the shift register stage representative of the respective seismic channel, whereby said first gates provide enabling signals upon said shift register being shifted to those stages representative of the seismic channels selected by said selector switches, e. a monostable multivibrator having an input coupled to the output of each of said first gates, said multivibrator providing a center-line pulse upon the presence of an enabling signal on any one of said first gates, and f. a second gate having one input coupled to the output of said multiplexer and a second input coupled to the output of said multivibrator, thereby coupling both modulation signals and center-line pulses to said cathode-ray tube for intensity modulation of the electron beam.

* * * * *